United States Patent

Northrup

[15] 3,692,956

[45] Sept. 19, 1972

[54] SEALED MAGNETIC TAPE CASSETTE APPARATUS

[72] Inventor: Malcolm B. Northrup, Richardson, Tex.

[73] Assignee: Collins Radio Company, Dallas, Tex.

[22] Filed: Nov. 20, 1970

[21] Appl. No.: 91,337

[52] U.S. Cl. ..........................179/100.2 Z, 179/2 D, 179/100.2 S, 242/199, 274/4 C

[51] Int. Cl. ..........................G11b 23/08, G11b 15/12

[58] Field of Search ..179/100.2 S, 100.2 Z, 100.2 D; 242/198, 199; 274/4 C

[56] References Cited

UNITED STATES PATENTS

| | | | |
|---|---|---|---|
| 2,971,716 | 2/1961 | Sampson | 174/100.2 S |
| 3,416,150 | 12/1968 | Lindberg | 179/100.2 Z |
| 3,199,093 | 8/1965 | Cheney | 179/100.2 D |
| 3,510,605 | 5/1970 | Ottens | 179/100.2 Z |
| 3,265,817 | 8/1966 | Gilman | 179/100.2 Z |
| 3,115,289 | 12/1963 | Namenyi-Katz | 179/100.2 S |
| 3,401,899 | 9/1968 | Goldberg | 242/198 |
| 3,420,461 | 1/1969 | Cousino | 179/100.2 Z |
| 3,566,132 | 2/1971 | Walker | 179/100.2 S |
| 3,458,667 | 7/1969 | Burquez | 179/100.2 Z |

OTHER PUBLICATIONS

Advertisement in 1968 Lafayette Catalog & Explanation in Panasonic Owners Manual for RQ232S

*Primary Examiner*—Bernard Konick
*Assistant Examiner*—Jay P. Lucas
*Attorney*—Robert J. Crawford and Bruce C. Lutz

[57] ABSTRACT

A magnetic tape cassette including a tape recording head wherein the cassette is environmentally sealed. The cassette includes a reel brake for preventing accidental movement of the reels when the cassette is not attached to a tape drive unit. The cassette further includes means or detecting end of tape and middle of tape conditions and for preventing accidental recording.

4 Claims, 6 Drawing Figures

INVENTOR
MALCOLM B. NORTHRUP

BY Bruce C Lutz
ATTORNEY

INVENTOR
MALCOLM B. NORTHRUP

BY

ATTORNEY

SEALED MAGNETIC TAPE CASSETTE APPARATUS

The present invention pertains generally to electronics and more specifically to magnetic tape cartridges. Even more specifically the invention is related to a magnetic tape cartridge which is environmentally sealed to provide superior playback performance.

Prior art magnetic tape cassettes have included tape reel mechanisms for coaction with tape drive units wherein the tape connected between two reels have an environmentally exposed surface. The few cassettes having reel brakes have been of the type which were either expensive to produce, short lasting, or non-conducive to providing clean environmental conditions for the tape. Further, the method of detecting end of tape conditions was often on the basis that the driven reel would no longer turn. However, of prime consideration in prior art cassettes is the fact that the exposed tape surface tended to accumulate dirt particles and water vapor from the environment. As is well known, both dirt and water vapor prevent detection of magnetic particle orientation on the tape during the time that the film or particle is between the tape and the tape head. Further, since the record and playback heads for the tape in the cassette were normally not identical in configuration or orientation, associated data reproduction errors would occur. Normally, information is recorded on the tape at one map location and is played pack at another widely separated map location, one of the two normally being in a relatively clean environment. The present invention overcomes the above referenced prior art deficiencies by including end of tape position indicators and magnetic tape head means along with the tape and associated reels all in a single environmentally sealed tape cassette.

It is therefore an object of the present invention to provide an improved magnetic recording cassette.

Other objects and advantages of this invention will be apparent from the remaining description and appended claims in conjunction with the drawings wherein:

Figure 1:
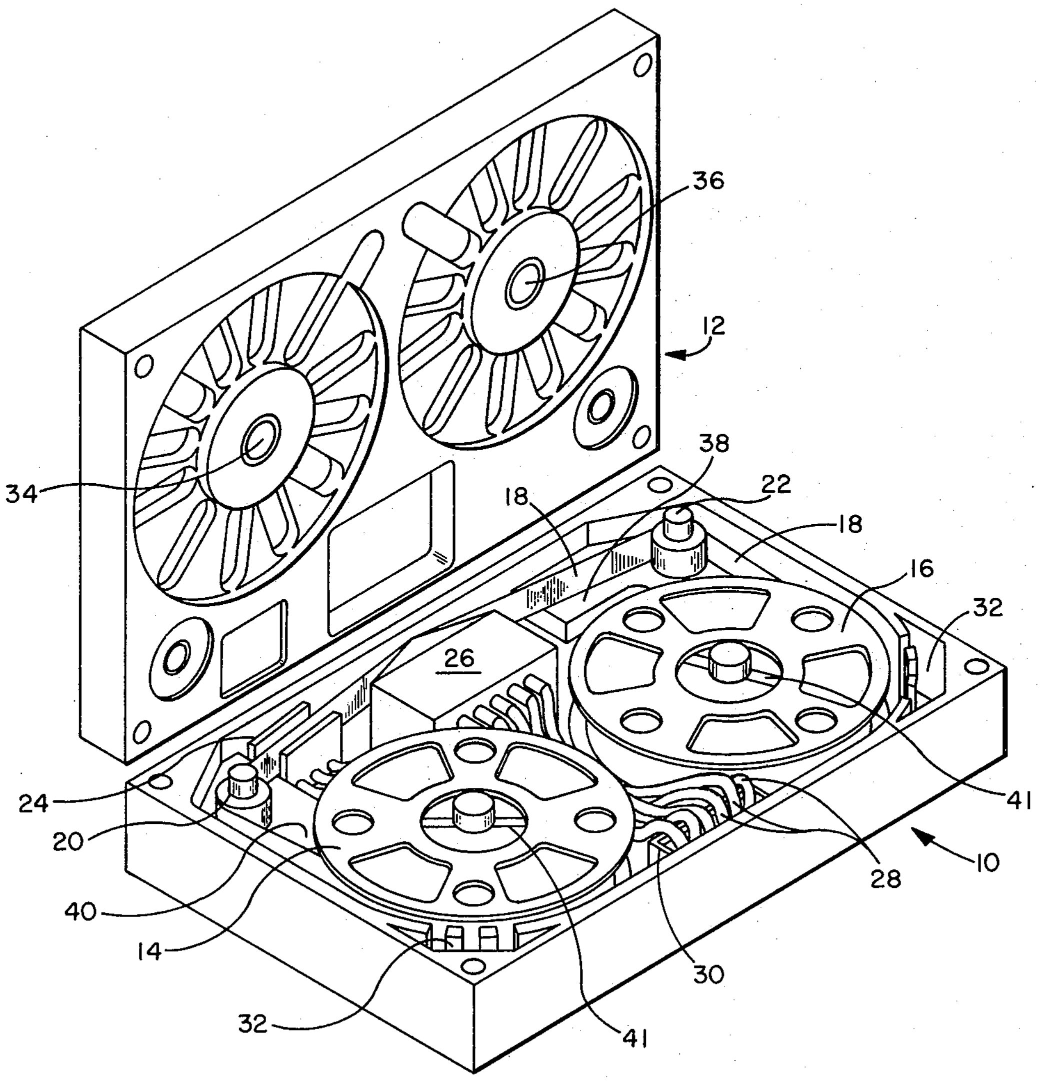
FIG. 1 is an isometric presentation of the top and bottom sealable portions of the cassette.

In FIG. 1 two containers 10 and 12 are shown which will be referred to as the bottom and top parts, respectively, of the cassette. Within part 10 are two reels generally designated as 14 and 16 containing tape 18 which is pulled passed guides 20 and 22 from one of the reels 14 to the other reel 16 or vice versa. During this process the tape is passed through a tape position detection or sensor means generally designated as 24 and a tape head 26. A plurality of wires generally designated as 28 connect tape head 26 and means 24 to an electrical connecting means 30. In the corner of part 10 are found two cavities 32 and into which may be placed desicants for the purpose of removing moisture from within the container of FIG. 1. On part 12 are further holes or cavities, not numbered, for the purpose of mating with the guides 20 and 22 as well as head 26 and means 24. Further cavities 34 and 36 include bearings for coaction with the shafts of reels 14 and 16. The raised portions or lands 38 and 40 of the bottom portion 10 coact with similar portions on part 12 to keep the tape 18 vertically aligned. Sensor means 24 provides not only end of tape indication but middle of tape indication for purposes which will be apparent later. Beneath reel 14, but not visible in FIG. 1, is an infrared light means, similar to 24, which is also electrically connected to connector 30.

Figure 2:
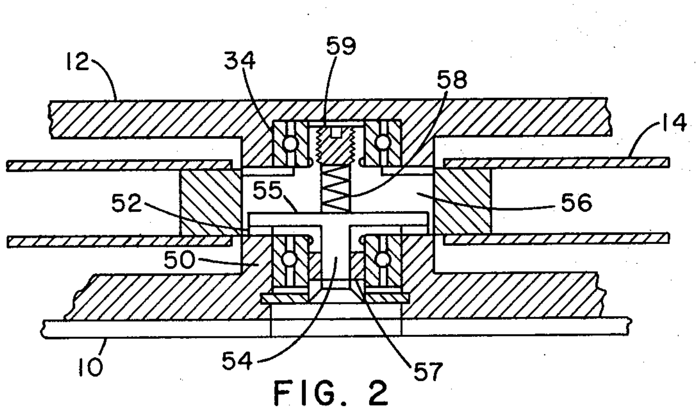
FIG. 2 is a drawing of the reel brake mechanism.

In FIG. 2 a cut-away drawing discloses a simplified version of a reel brake mechanism. Several parts are given the same numbers as utilized in FIG. 1. In addition part 50 is an extension of the base material of part 10. Fitted into part 50 and into the cavity 34 are bearings which are not numbered. These bearings are utilized to support and allow rotation of the reels 14 and 16 through rotary drive energy from the drive mechanism. A T-shaped pin 54 has arms 55. These arms 55 are allowed to move vertically in a space designated as 41 in FIG. 1 and in the space shown in FIG. 2. The portion 56 is the rest of the rotating hub and does not restrict vertical movement of pin 54. A spring 58 urges the pin 54 in a downward direction. The spring 58 is held in place by a set screw 59. In the position shown, the arms 55 rest against a brake pad means or friction means 52 to prevent rotation of the reel 14. When the cassette is placed on a power drive mechanism, a further pin or other means will move pin 54 vertically to free it from the position holding effect of friction means 52. Drive of the reel is accomplished by a screw driver mechanism which abuts a slot 57 in a lower portion of the hub 56. The screw driver mechanism is used in the embodiment shown to product vertical movement of pin 54. Any movement of the reel 14 will of necessity cause movement of the pin 54 and its associated arms 55 due to its positive drive arrangement in the slot 41 of hub 56. However, when the cassette is removed from the drive mechanism the friction between pad 52 and arms 55 prevents accidental rotation of the reel.

Prior art mechanisms utilized friction forces between the reel 14 and a further braking mechanism. These mechanisms, however, required further mechanical inlets to the cassette and allowed the entry of outside contaminants. The present mechanism utilizes the single pair of mechanical inlets which are already required to provide a rotating drive. A further problem with the prior mechanism was in the proximity of abrasive contaminants from operation of the braking mechanism, and the tape. The present mechanism is of a design that abrasion products will not normally occur, and if they do occur are unlikely to be carried to the tape to cause reproduction problems.

As is known to those skilled in the art the lack of an effective brake mechanism may allow free rotation of the reels within the cassette when being transported. The resultant loosening of tape on a reel will cause reproduction problems due to incorrect tensioning of the tape.

Figure 3:
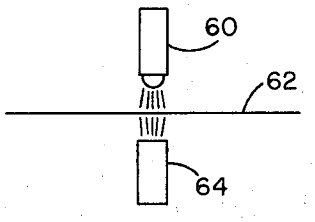
FIG. 3 is a top view of the end of tape position indicator.
Figure 4:
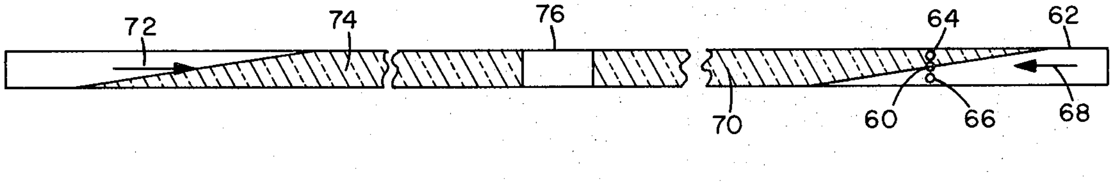
FIG. 4 is a front view of the subject matter of FIG. 3.

In FIG. 3 an infrared light radiation source 60 is shown emitting light toward a tape 62. Although the magnetic oxide will prevent passage of infrared light through the base material of the tape, water film and dirt will not prevent light passage. Therefore, if the tape is cleaned of magnetic oxide, two sensors 64 and 66 will receive light from source 60. As shown, only the top sensor 64 may be observed. However, reference to FIG. 4 will illustrate the positioning of the source 60 as will as the upper photo sensor 64 and the lower sensor 66. If the tape is moving in the direction of arrow 68, it will be observed that if the magnetic material on the tape is in the portion generally labeled as 70, the sensor 66 will be the first to receive infrared light. This differential reception will indicate to the tape drive mechanism that the end of the tape is imminent and the drive mechanism should be reversed. Likewise, in the left-hand portion of FIG. 4 a clear portion 72 and a magnetic portion 74 are shown whereby the tape is cleared of magnetic oxides in such a way that movement of the tape in the arrow direction indicated will first provide light to the upper sensor 64. If a clear vertical strip is placed at the center of the tape as shown by designator 76, both sensors 64 and 66 will receive light simultaneously and thereby indicate that the tape is evenly distributed on the two reels.

It is advantageous to ascertain the middle of the tape since this allows quicker retrieval of data from any portion of the tape by allowing a servo mechanism to reposition the tape with half the tape on each of the reels 14 and 16 between access periods of the driving mechanism.

Figure 5:
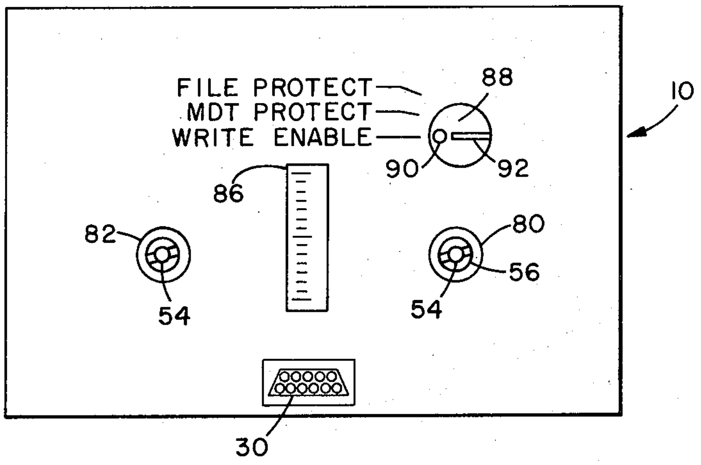
FIG. 5 is a view of the back portion of the part of the cassette containing the tape reels.

Reference to FIG. 5 will disclose the other end of connector 30 as well as cavities 80 and 82 which are provided for allowing a mechanical input from the drive mechanism to the reels. The reels are mechanically attached to coacting means 57 including pin 54 as shown in FIG. 2. As previously indicated, insertion of the cartridge in the drive mechanism will reposition pin 54 to remove the braking action and allow relatively friction-free movement of the reels in response to the mechanical drive. Also shown in FIG. 5 is a time indicator 86 which may be of the deposition type to show number of hours of operation of the tape whereby the remaining useful life of the tape can be easily estimated. Further, a rotatable plate 88 is shown with a hole 90 and a slot 92. Back of hole 90 is the previously referenced, but not shown, infrared radiation source between the inside surface of unit 10 and the reel 14. The hole 90 in combination with disc 88 acts as a shutter which may be rotated to direct the radiation and thereby provide various amounts of information to coacting sensor units incorporated in the drive mechanism base. In one embodiment of the invention, the position of disc 88, as shown, activates two sensors to allow writing on the tape. In moving up to the next position, only one indicator receives light and in said embodiment this one indicator prevents writing on one track of the four-track tape. Movement of disc 88 to the third position (file protection) eliminates light from the bulb to any of the detectors and thus as designed, prevents writing any information or data on the tape. This is, of course, fail safe since burn out of the infrared bulb will prevent either sensor from receiving light and thereby prevent writing on the tape to thereby possibly destroying valuable data. By data I intend to include any recordable signals.

The center and end indicators utilized in the present invention are unique in being able to easily and simply provide an indication of these three conditions of the tape. Prior art methods of indication could not have provided the detection of center of tape and in any event were less satisfactory in terms of detection simplicity in even providing end of tape and tape movement direction detection.

Figure 6:
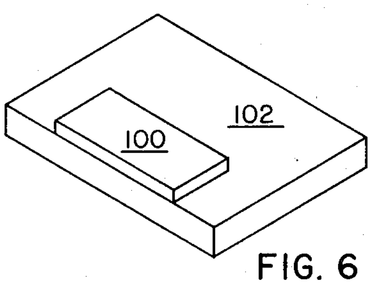
FIG. 6 shows a cassette in position on a electrical recorder and drive mechanism.

In FIG. 6 a cassette 100 is shown mounted on a power base 102. Cassette 100 may be the same as that shown in FIG. 1. As indicated in the description of FIG. 5, this cassette receives electrical and mechanical inputs from power base 102, and the power base 102 receives electrical and radiation outputs from cassette 100. The radiation output is detected by sensors in base 102 and utilized in conjunction with logic means for restricting or allowing write signals to the cassette 100 in the manner referenced in conjunction with FIG. 5.

In summary, the present invention primarily is directed to the incorporation of a tape head in a cassette first to eliminate discontinuities in reading or writing on a magnetic medium such as tape caused by contaminants such as dirt and water vapor received from the environment and second to eliminate alignment induced reproduction problems. The prior art has overcome the problem by brute force methods such as making the data of a long enough duration or the tape speed fast enough to prevent the dirt from disrupting the transfer of information for a significant period of time. The present cassette thereby allows an order of magnitude increase in data bit storage by reducing the amount of tape required to store a single data bit. The incorporation of the magnetic head in the cassette eliminates alignment problems of the head with respect to the tape by preventing change of tape head positions with respect to the tape which is a normal occurrence when signals are recorded by a tape head on one power base and played back by a tape head on another power base.

Other features of the invention are the reel brake and tape position detection means as well as the apparatus for preventing accidental destruction through the writing operation of data stored on the cassette tape.

I therefore wish to be limited not by the scope of the embodiment disclosed but only by the scope of the appended claims wherein,

I claim:

1. The method of detecting end of tape and an intermediate position of tape conditions comprising the steps of:

removing the magnetically inscribable material from the tape in an angular configuration at each end and in a transverse configuration at an intermediate position;

supplying a source of radiation on one side of the tape;

detecting radiation from said source on the other side of said tape wherein the radiation will only pass the cleared portion of said tape and wherein three detection configurations are obtained by the three conditions of the first, the second, and both detectors first receiving the radiation from said source.

2. Apparatus means for preventing signal reproduction problems due to tape misalignment in a magnetic tape cartridge comprising, in combination:

tape cartridge means;

tape storage means mounted in said cartridge means;

magnetic record and playback means mounted in said cartridge means;

tape means connected to said tape storage means and positioned contiguous said magnetic record means and playback means, said tape means being diagonally cleared of magnetic oxide at each end vertically cleared of magnetic oxide in a centrally located intermediate portion;

radiation source means mounted contiguous one side of said tape means, said magnetic oxide being impermeable to the radiation from said source means; and first and second detector means mounted contiguous the other side of said tape means, said first detector means first receiving radiation at one end of said tape means, said second detector means first receiving radiation at the other end of said tape means and both of said detectors receiving radiation substantially simultaneously at the intermediate portion of said tape means.

3. A magnetic tape cartridge system comprising, in combination:

magnetic recording container means including mechanical and electrical inputs and outputs sealed against environmental contaminants;

magnetic head means electrically connected to said electrical inputs and outputs of said container and mounted therein:

magnetically recordable means;

means for storing said magnetically recordable means and moving it contiguous said magnetic head in response to mechanical inputs to said container;

radiation source means;

tape drive mechanism; and shutter means situated in said container means between said radiation source means and said tape drive mechanism whereby write signals are supplied to said magnetic head means via said electrical inputs of said container means only upon reception of radiation from said container means by said tape drive mechanism means through the movement of the shutter to an inoperative position from the operative position in which it blocks the reception of said radiation by said tape drive mechanism.

4. A magnetic tape cartridge comprising, in combination:

magnetic recording container means including mechanical and electrical inputs and outputs sealed against environmental contaminants;

tape means;

reel means for storing said tape means and adapted for receiving mechanical inputs as supplied to said container means;

magnetic head means electrically connected to said electrical inputs and outputs of said container means and mounted therein;

friction means contiguous the mechanical input portion of said container means;

rotatable hub means forming a portion of said mechanical input said hub means including female drive portion and having an opening therein;

brake means within said hub means including arm means for contact with said friction means and a central portion situated contiguous the driving portion of said hub means and in said opening; and biasing means within said hub means coacting with said brake means for forcing said arms into contact with said friction means for constraining movement of said hub means when said hub is not being driven and allowing movement of said arms away from said friction means when a male drive mechanism is being inserted into the female portion of said drive hub.

* * * * *